US012768298B1

(12) United States Patent
Huang et al.

(10) Patent No.: US 12,768,298 B1
(45) Date of Patent: Oct. 20, 2026

(54) TUBE INSERT ASSEMBLY OF GAS TURBINE ENGINE

(71) Applicant: Pratt & Whitney Canada Corp., Longueuil (CA)

(72) Inventors: Ruoxin Huang, Montreal (CA); Remy Synnott, St-Jean-sur-Richelieu (CA); Philippe Savard, Terrebonne (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/317,862

(22) Filed: Sep. 3, 2025

(51) Int. Cl.
*F02C 3/04* (2006.01)
*F01D 25/12* (2006.01)

(52) U.S. Cl.
CPC ................ *F02C 3/04* (2013.01); *F01D 25/12* (2013.01); *F05D 2220/32* (2013.01)

(58) Field of Classification Search
None
See application file for complete search history.

(56) References Cited

U.S. PATENT DOCUMENTS 5,867,976 A * 2/1999 Ziegler, Jr. ............ F01D 21/003 60/803
9,766,159 B2 * 9/2017 Konomura ......... G02B 23/2476
9,926,802 B2 3/2018 Coles
11,226,102 B2 1/2022 Low
11,585,269 B1 2/2023 Girard
11,661,856 B2 5/2023 Lighty
11,821,363 B1 11/2023 Girard
11,859,503 B1 * 1/2024 Lefebvre ............... F01D 21/003

FOREIGN PATENT DOCUMENTS

CN 220870022 U 4/2024
FR 3121181 B1 9/2023

* cited by examiner

*Primary Examiner* — Courtney D Heinle
*Assistant Examiner* — Danielle M. Christensen
(74) *Attorney, Agent, or Firm* — Getz Balich LLC

(57) ABSTRACT

A tube insert assembly for a gas turbine engine is provided. The tube insert assembly includes a receptacle base disposed on a static structure of the gas turbine engine. The receptacle base has a mounting flange and a bore extending through the receptacle base. A top surface of the mounting flange includes an asymmetrical recess disposed around the bore. The tube insert assembly also includes a tubular insert having a tube and an asymmetrical flange disposed around a circumference of the tube. The asymmetrical flange is disposed within the asymmetrical recess of the mounting flange and the tube is disposed within the bore of the receptacle base.

20 Claims, 7 Drawing Sheets

TUBE INSERT ASSEMBLY OF GAS TURBINE ENGINE

TECHNICAL FIELD

This disclosure relates generally to propulsion systems for aircraft and, more particularly, to a tube insert assembly for a gas turbine engine.

BACKGROUND OF THE ART

Propulsion systems for aircraft may typically include a gas turbine engine utilizing outlet pipes and tube inserts. Various tube insert assemblies are known in the art. While these known tube insert assemblies may be suitable for their intended purposes, there is always room in the art for improvement.

SUMMARY

According to an aspect of the present disclosure, a tube insert assembly of a gas turbine engine is provided. The tube insert assembly includes a receptacle base disposed on a static structure of the gas turbine engine. The receptacle base includes a mounting flange and a bore extending through the receptacle base. A top surface of the mounting flange includes an asymmetrical recess disposed around the bore. The tube insert assembly also includes a tubular insert having a tube and an asymmetrical flange disposed around a circumference of the tube. The asymmetrical flange is disposed within the asymmetrical recess of the mounting flange and the tube is disposed within the bore of the receptacle base.

In any of the aspects or embodiments described above and herein, the tube insert assembly may further include a spacer plate disposed on the mounting flange. The spacer plate may include an asymmetrical aperture disposed around the asymmetrical flange of the tubular insert. The asymmetrical aperture and the asymmetrical recess may have substantially similar shapes.

In any of the aspects or embodiments described above and herein, the asymmetrical flange may fit in a single orientation within the asymmetrical recess and the asymmetrical aperture.

In any of the aspects or embodiments described above and herein, the asymmetrical flange, the asymmetrical recess, and the asymmetrical aperture may prevent lateral movement and rotation of the tubular insert with respect to the receptacle base and the spacer plate.

In any of the aspects or embodiments described above and herein, the mounting flange may include a first perimeter with a notched region. The spacer plate may include a second perimeter with a tab that projects downwardly over the notched region of the mounting flange.

In any of the aspects or embodiments described above and herein, the tab over the notched region may prevent rotation of the spacer plate with respect to the receptacle base.

In any of the aspects or embodiments described above and herein, the receptacle base may further include a first bolt hole and a second bolt hole extending through the mounting flange on opposing sides of the asymmetrical recess. The spacer plate may further include a third bolt hole and a fourth bolt hole extending through the spacer plate on opposing sides of the asymmetrical aperture. The third bolt hole may be aligned above the first bolt hole, and the fourth bolt hole may be aligned above the second bolt hole.

In any of the aspects or embodiments described above and herein, the tube insert assembly may further include a connecting pipe having a flange disposed over the spacer plate, a first nut disposed below the first bolt hole, and a second nut disposed below the second bolt hole. The tube insert assembly may further include a first bolt extending through the flange, the third bolt hole, and the first bolt hole, and may be engaged with the first nut. The tube insert assembly may further include a second bolt extending through the flange, the fourth bolt hole, and the second bolt hole, and may be engaged with the second nut.

In any of the aspects or embodiments described above and herein, the receptacle base may be integrated with or fixed to the static structure. The bore may extend through the static structure. The tube may extend into a core gas flow path within the static structure.

In any of the aspects or embodiments described above and herein, a depth of the asymmetrical recess may be less than a thickness of the mounting flange.

In any of the aspects or embodiments described above and herein, the asymmetrical recess may include one or more asymmetrical extensions from a circular shape. The asymmetrical flange may include one or more asymmetrical protrusions from the circular shape. The one or more asymmetrical extensions may correspond in size and alignment with the one or more asymmetrical protrusions.

In any of the aspects or embodiments described above and herein, the bore of the receptacle base may include an inset shoulder. The tubular insert may include a shoulder disposed between the asymmetrical flange and the tube. The shoulder of the tubular insert may be seated on the inset shoulder of the bore. A first diameter of the asymmetrical flange may be greater than a second diameter of the shoulder, and the second diameter of the shoulder may be greater than a third diameter of the tube.

In any of the aspects or embodiments described above and herein, the tube insert assembly may further include a sealing element disposed between the asymmetrical flange and the connecting pipe.

According to an aspect of the present disclosure, a tube insert assembly of a gas turbine engine is provided that includes a receptacle base disposed on a static structure of the gas turbine engine. The receptacle base includes a mounting flange and a bore extending through the receptacle base. The tube insert assembly also includes a tubular insert having a tube and an asymmetrical flange disposed around a circumference of the tube. The tube is disposed within the bore of the receptacle base. The tube insert assembly further includes a spacer plate disposed on the receptacle base. The spacer plate includes an asymmetrical aperture disposed around the asymmetrical flange of the tubular insert.

In any of the aspects or embodiments described above and herein, a top surface of the mounting flange may include an asymmetrical recess disposed around the bore. The asymmetrical flange may be disposed within the asymmetrical recess of the mounting flange.

In any of the aspects or embodiments described above and herein, the asymmetrical flange, the asymmetrical recess, and the asymmetrical aperture may prevent lateral movement and rotation of the tubular insert with respect to the receptacle base and the spacer plate.

In any of the aspects or embodiments described above and herein, the receptacle base may be integrated with or fixed to the static structure. The bore may extend through the static structure. The tube may extend into a core gas flow path within the static structure.

In any of the aspects or embodiments described above and herein, the mounting flange may include a first perimeter with a notched region. The spacer plate may include a second perimeter with a tab that projects downwardly over the notched region of the mounting flange.

In any of the aspects or embodiments described above and herein, the tab over the notched region may prevent rotation of the spacer plate with respect to the receptacle base.

According to an aspect of the present disclosure, a tube insert assembly of a gas turbine engine is provided that includes a receptacle base disposed on a static structure of the gas turbine engine. The receptacle base includes a bore extending through the receptacle base and an asymmetrical recess disposed around the bore. The receptacle base includes a first perimeter with a notched region. The tube insert assembly also includes a tubular insert comprising a tube and an asymmetrical flange disposed around a circumference of the tube. The asymmetrical flange is disposed within the asymmetrical recess, and the tube is disposed within the bore. The tube insert assembly also includes a spacer plate disposed on the receptacle base. The spacer plate includes an aperture disposed around the asymmetrical flange. The spacer plate further includes a second perimeter with a tab that projects downwardly over the notched region of the receptacle base.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
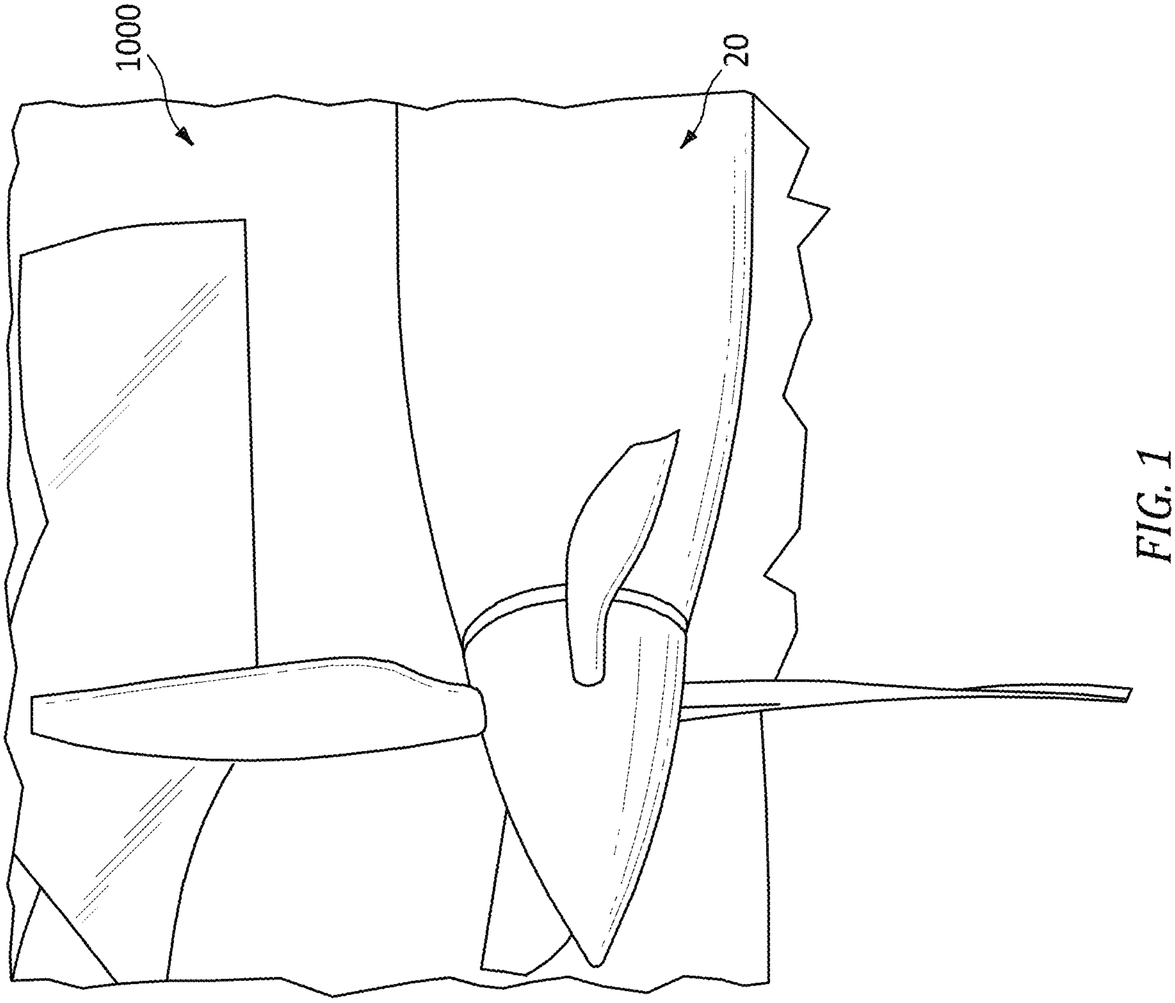
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
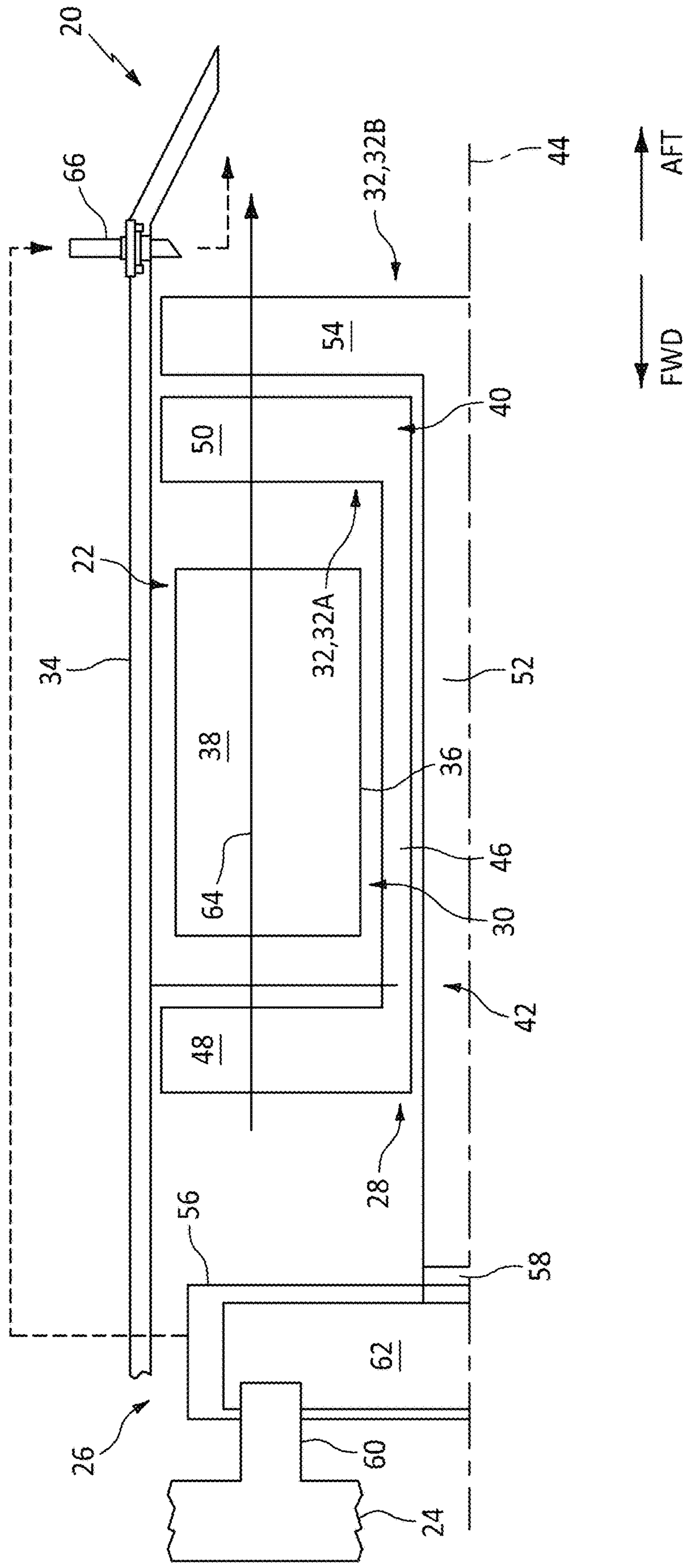
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, or other intermittent combustion engines.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about an axial centerline 44 (e.g., a rotational axis) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the bladed first turbine rotor 50.

The second rotational assembly 42 of FIG. 2 includes a second shaft 52 (e.g., an engine output shaft or power turbine shaft) and a bladed second turbine rotor 54 for the power turbine 32B. The second shaft 52 is connected to the bladed second turbine rotor 54. The second shaft 52 is coupled to the propulsor 24 by the drivetrain 26.

The drivetrain 26 includes a gearbox 56 (e.g., a reduction gearbox (RGB)), a first input shaft 58, and an output shaft 60 (e.g., a propulsor output shaft or a propeller shaft). The gearbox 56 includes and houses a gear assembly 62. The gear assembly 62 couples the first input shaft 58 with the output shaft 60. For example, the gear assembly 62 may be a reduction gear assembly configured to drive rotation of the output shaft 60 at a reduced rotational speed relative to the first input shaft 58. The first input shaft 58 is coupled to (e.g., mounted on) the second shaft 52, and interconnects the second shaft 52 with the gear assembly 62. As an alternative, the second shaft 52 may directly connect with the gear assembly 62 without the first input shaft 58 therebetween. The output shaft 60 is coupled to (e.g., mounted on) the propulsor 24, and interconnects the propulsor 24 with the gear assembly 62.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During operation of the propulsion system 20 of FIG. 2, ambient air enters the propulsion system 20 (e.g., through an air intake) and is directed through the engine 22 along a core gas flow path 64. The ambient air flow along the core gas flow path 64 is compressed in the compressor section 28 by rotation of the bladed compressor rotor 48, and directed into the combustor 36 (e.g., the combustion chamber 38). Fuel is injected into the combustion chamber 38 and mixed with the compressed air to provide a fuel-air mixture. This fuel-air mixture is ignited, and combustion products thereof flow through the high-pressure turbine 32A and the power turbine 32B and are exhausted from the propulsion system 20. The bladed first turbine rotor 50 and the bladed second turbine rotor 54 rotationally drive the first rotational assembly 40 and the second rotational assembly 42, respectively, in response to the combustion gas flow through the high-pressure turbine 32A and the power turbine 32B along the core gas flow path 64. The second rotational assembly 42 (e.g., the second shaft 52) drives rotation of the propulsor 24 through the drivetrain 26.

Excess lubricant and vented gases from the gearbox 56 may be evacuated to prevent overpressure and to protect internal seals. A plenum of the gearbox 56 may be routed to the exhaust of the engine 22 via an outlet pipe, allowing entrained oil mist to be burned in the exhaust before being released to the atmosphere. However, under certain operating conditions, the static pressure drop across the outlet pipe may be insufficient, which impedes flow and risks pressure buildup in the gearbox 56. Increasing pipe diameter or applying active pumps may add weight, cost, and complexity. A tube insert assembly 66 that protrudes through the engine static structure 34 and into the core gas flow path 64 may have a beveled end that is specifically oriented to reduce local static pressure.

Figure 3B:
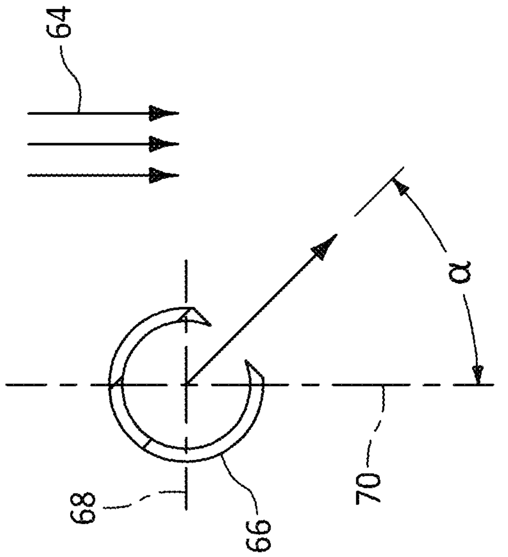
FIG. 3B schematically illustrates a cutaway, plan view of the tube insert assembly with respect to the core gas flow path, in accordance with one or more embodiments of the present disclosure.
Figure 3A:
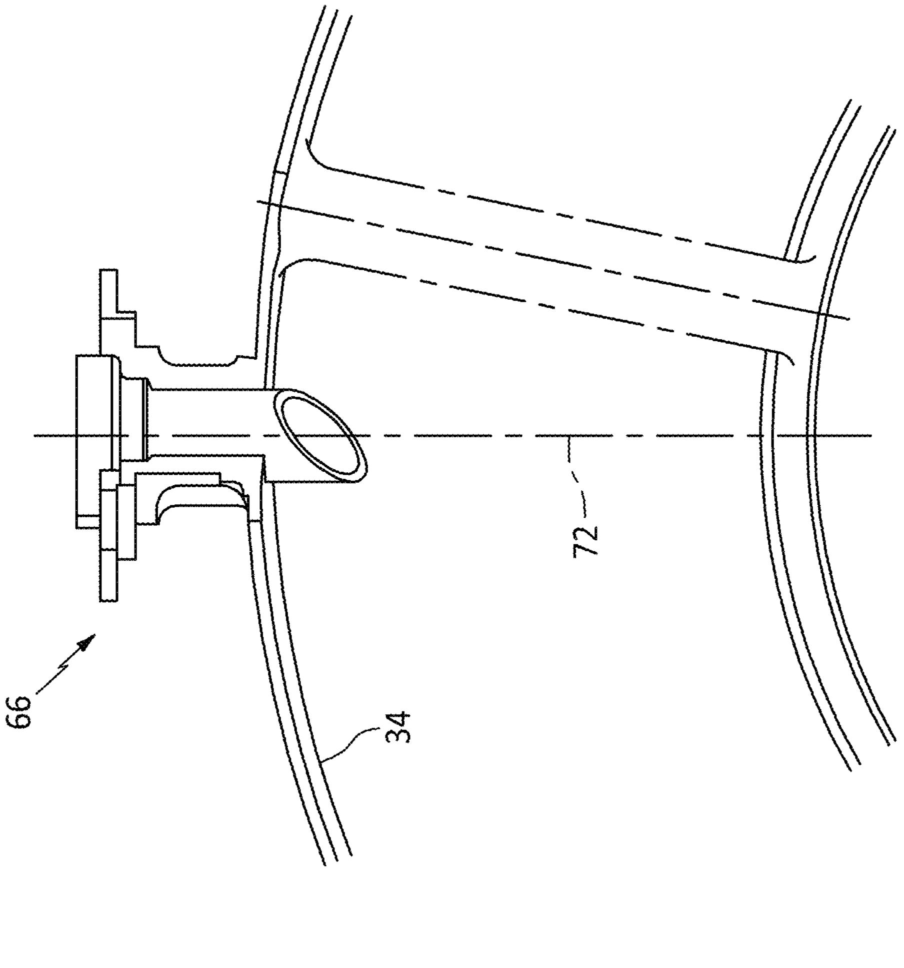
FIG. 3A schematically illustrates a cutaway, axially forward view of a tube insert assembly through an engine static structure into a core gas flow path, in accordance with one or more embodiments of the present disclosure.

FIG. 3A schematically illustrates a cutaway, axially forward view of the tube insert assembly 66 through the engine static structure 34 into the core gas flow path 64. FIG. 3B schematically illustrates a cutaway, plan view of the tube insert assembly 66 with respect to the core gas flow path 64. To obtain an optimal pressure drop, the orientation of the beveled end of the tube insert assembly 66 with respect to the core gas flow path 64 (e.g., with respect to a local x-axis 68, y-axis 70, and z-axis 72) is critical in order to yield the full benefits of the beveled end. For example, an open side of the beveled end of the tube insert assembly 66 is rotated about the z-axis 72, to form a predetermined angle $\alpha$ with respect to a y-axis 70 in the direction of the core gas flow path 64. The predetermined angle $\alpha$ induces a localized Venturi effect and increases static pressure drop across an outlet at the gearbox 56. Embodiments of the present disclosure ensure that the tube insert assembly 66 is properly assembled with the predetermined angle $\alpha$ at the beveled end.

Figure 4:
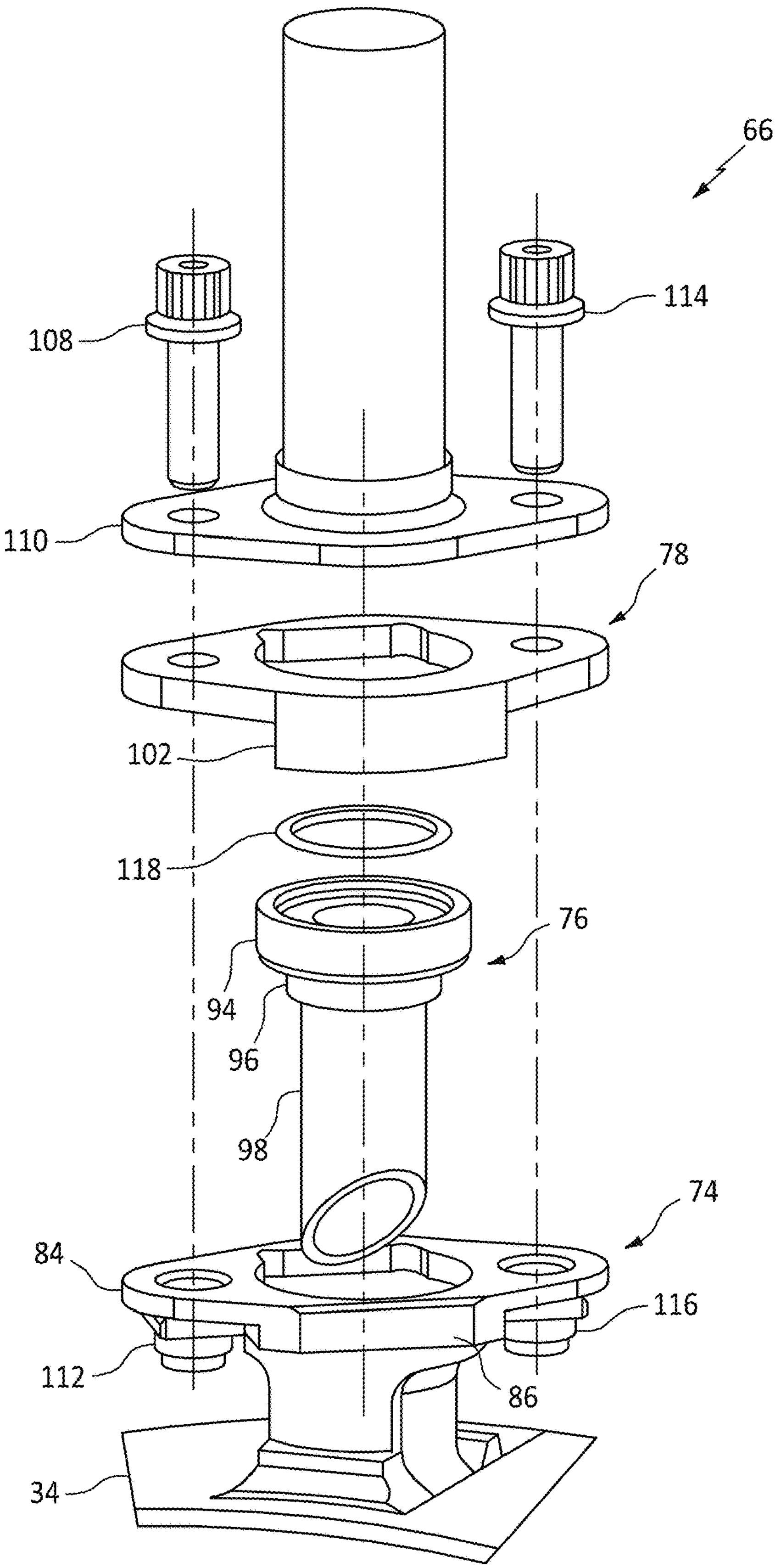
FIG. 4 schematically illustrates an exploded perspective view of the tube insert assembly, in accordance with one or more embodiments of the present disclosure.
Figure 5C:
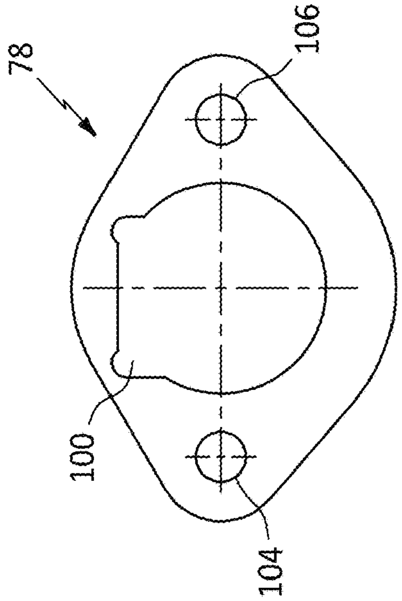
FIG. 5C schematically illustrates a plan view of a spacer plate of the tube insert assembly, in accordance with one or more embodiments of the present disclosure.
Figure 5B:
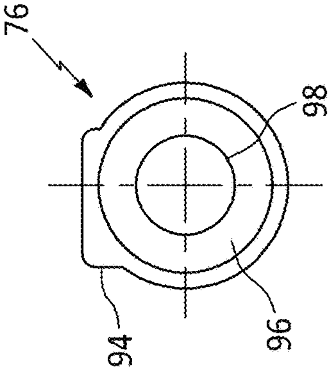
FIG. 5B schematically illustrates a plan view of a tubular insert of the tube insert assembly, in accordance with one or more embodiments of the present disclosure.
Figure 5A:
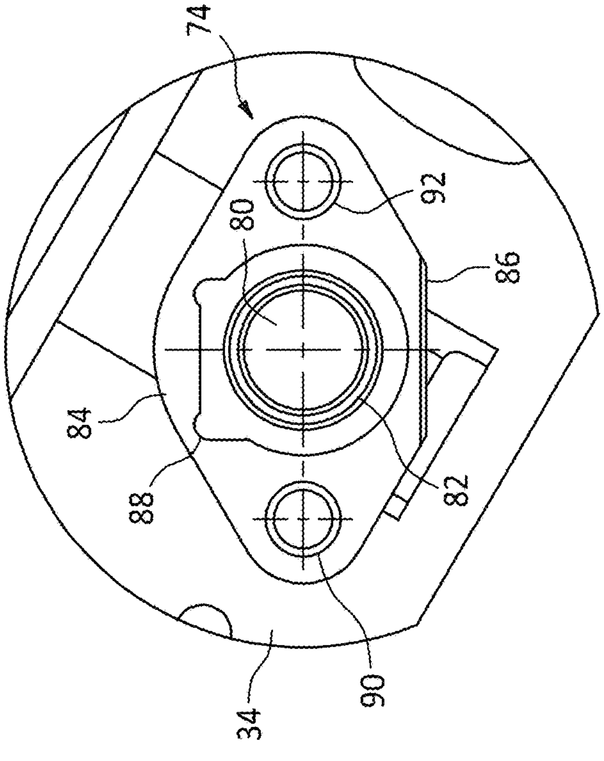
FIG. 5A schematically illustrates a plan view of a receptacle base of the tube insert assembly, in accordance with one or more embodiments of the present disclosure.

FIG. 4 schematically illustrates an exploded perspective view of the tube insert assembly 66. The tube insert assembly 66 includes a receptacle base 74, a tubular insert 76, and a spacer plate 78. FIG. 5A schematically illustrates a plan view of the receptacle base 74. FIG. 5B schematically illustrates a plan view of the tubular insert 76. FIG. 5C schematically illustrates a plan view of the spacer plate 78.

The receptacle base 74 may be integrated into or fixed to the engine static structure 34. However, the present disclosure is not limited to a particular placement of the receptacle base within the engine 22. The receptacle base 74 includes a cylindrical bore 80 with an inset shoulder 82. The cylindrical bore 80 may be centrally disposed in the receptacle base 74 and may extend through the engine static structure 34. The present disclosure is not limited to any particular size or shape of the cylindrical bore 80. The receptacle base 74 also includes a mounting flange 84 having a perimeter with a notched region 86. The present disclosure is not limited to any particular size or shape of the perimeter or the notched region 86.

A top surface of the mounting flange 84 includes an asymmetrical recess 88 around the cylindrical bore 80. The asymmetrical recess 88 has a depth that does not exceed a thickness of the mounting flange 84. The present disclosure is not limited to any particular size or asymmetrical shape of the asymmetrical recess 88. For example, the asymmetrical recess 88 may include one or more asymmetrical extensions from an otherwise circular shape, as shown in FIG. 5A. A first bolt hole 90 and a second bolt hole 92 extend through the mounting flange 84 on opposing sides of the asymmetrical recess 89. The first bolt hole 90 and the second bolt hole 92 do not extend through the engine static structure 34. The present disclosure is not limited to any particular number, arrangement, size, shape, or configuration of the bolt holes.

The tubular insert 76 includes an asymmetrical flange 94 with an outer profile that fits within the asymmetrical recess 88 of the receptacle base 74. Aside from corresponding to the asymmetrical recess 88, the present disclosure is not limited to any particular size or asymmetrical shape of the asymmetrical flange 94. For example, the asymmetrical flange 94 may include one or more asymmetrical protrusions from an otherwise circular shape, as shown in FIG. 5B. The one or more asymmetrical protrusions of the asymmetrical flange 94 correspond in size and placement (e.g., alignment) with the one or more asymmetrical extensions of the asymmetrical recess 88.

A shoulder 96 extends below the asymmetrical flange 94, and has a circumference smaller than that of the asymmetrical flange 94. A beveled tube 98 extends below the shoulder 96, and has a circumference smaller than that of the shoulder 96. The beveled tube 98 ends in a beveled tip oriented to face in a downstream direction of the core gas flow path 64 at the predetermined angle $\alpha$, as shown and described above with respect to FIGS. 3A and 3B. The present disclosure is not limited to any particular angle of the beveled tip or the predetermined angle $\alpha$. For example, the predetermined angle $\alpha$ may be determined based on the engine 22. The beveled tube 98 is sized to fit within the cylindrical bore 80 of the receptacle base 74. For example, an outer diameter of the beveled tube 98 may be sized to fit within the cylindrical bore 80 such that leakage is minimized. The shoulder 96 is sized to be seated on the inset shoulder 82 of the receptacle base 74. The outer profile of the asymmetrical flange 94 fits within the asymmetrical recess 88 in a single orientation such that the beveled end of the beveled tube 98 is oriented at the predetermined angle α with respect to the y-axis 70 and the core gas flow path 64.

The spacer plate 78 includes a central asymmetrical aperture 100 having a profile substantially similar or identical to the asymmetrical recess 88 of the receptacle base 74. The asymmetrical aperture 100 is sized to fit around the asymmetrical flange 94 of the tubular insert 76. Aside from fitting around the asymmetrical flange 94, the present disclosure is not limited to any particular size or asymmetrical shape of the asymmetrical aperture 100. The spacer plate 78 also includes a tab 102 that projects downwardly from the perimeter of the spacer plate 78. The tab 102 is oriented to fit outside of the notched region 86 of the mounting flange 84. In an assembled state, the tab 102 prevents any rotation of the spacer plate 78 with respect to the receptacle base 74 about the z-axis 72. Aside from the configured engagement with the notched region, the present disclosure is not limited to any particular number, arrangement, size, shape, or configuration of the tab 102. In an alternative embodiment, the spacer plate 78 may include a notched region and the mounting flange 84 may have an upwardly projecting tab that fits outside of the notched region. A third bolt hole 104 and a fourth bolt hole 106 extend through the spacer plate 78 on opposing sides of the asymmetrical aperture 100. The third bolt hole 104 aligns with the first bolt hole 90 in the mounting flange 84, and the fourth bolt hole 106 aligns with the second bolt hole 92 in the mounting flange 84. Aside from this alignment, the present disclosure is not limited to any number, arrangement, size, shape or configuration of the bolt holes.

A first bolt 108 may pass through a flange of a connecting pipe 110, the third bolt hole 104, the first bolt hole 90, and into a first self-clinching nut 112, which may be pre-installed in the receptacle base 74. A second bolt 114 may pass through the flange of the connecting pipe 110, the fourth bolt hole 106, the second bolt hole 92, and into a second self-clinching nut 116, which may be pre-installed in the receptacle base 74. The present disclosure is not limited to any particular type, number, arrangement, size, shape, or configuration of the bolts or nuts, aside from matching the existing bolt holes. A sealing element 118 may be disposed between the asymmetrical flange 94 of the tubular insert 76 and the connecting pipe 110. The present disclosure is not limited to any particular type, number, size, or shape of the sealing element 118. For example, the sealing element 118 may be embodied as an elastomeric O-ring or a U-seal, an E-profile seal (e.g., E-seal), a metal C-seal (e.g., C-ring, internal pressure or external pressure), a spring-energized (SE) C-seal or E-ring, a metal O-ring or U-ring, an axial C-seal, a flat gasket (e.g., composite, metallic, or elastomeric), or any combination or equivalent thereof. An additional sealing element may be disposed between the asymmetrical flange 94 and the asymmetrical recess 88.

Figure 6B:
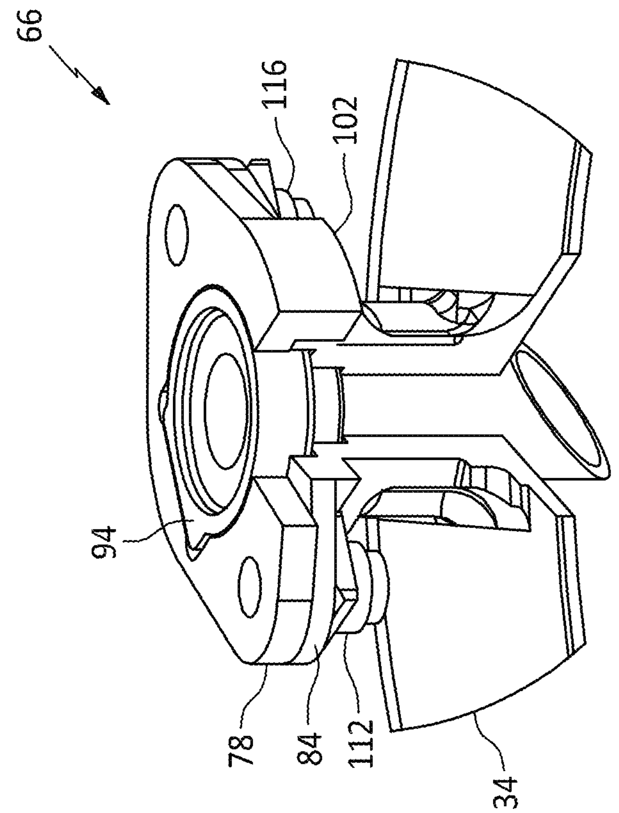
FIG. 6B schematically illustrates a partially cutaway, perspective view of the tube insert assembly in an assembled state, in accordance with one or more embodiments of the present disclosure.
Figure 6A:
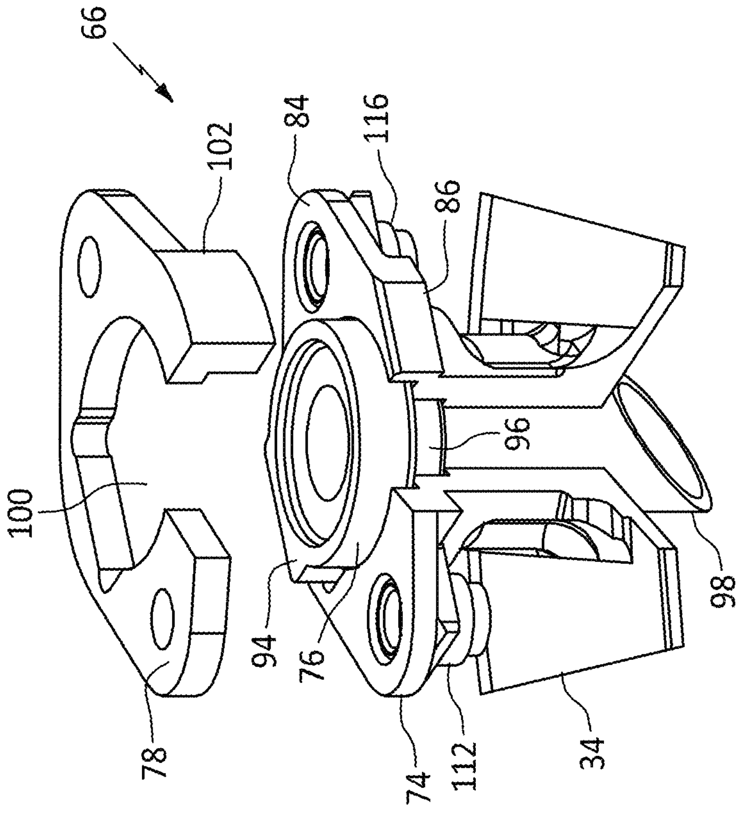
FIG. 6A schematically illustrates a partially cutaway, perspective view of the tube insert assembly in a partially assembled state, in accordance with one or more embodiments of the present disclosure.

FIG. 6A schematically illustrates a partially cutaway, perspective view of the tube insert assembly 66 in a partially assembled state. The beveled tube 98 of the tubular insert 76 is inserted into the cylindrical bore 80 of the receptacle base 74 such that the shoulder 96 of the tubular insert 76 sits flush against the inset shoulder 82 of the receptacle base 74 and the asymmetrical flange 94 of the tubular insert 76 fits within the asymmetrical recess 88 of the mounting flange 84. The asymmetrical flange 94 is disposed such that the tubular insert 76 is fixed laterally in the x-axis 68 and the y-axis 70, and fixed rotationally about the z-axis 72, with respect to the receptacle base 74.

FIG. 6B schematically illustrates a partially cutaway, perspective view of the tube insert assembly 66 in an assembled state. The spacer plate 78 is disposed flush against the mounting flange 84 of the receptacle base 74 such that the asymmetrical aperture 100 of the spacer plate 78 is disposed around the asymmetrical flange 94 of the tubular insert 76. The tab 102 of the spacer plate 78 is disposed against the notched region 86 on the perimeter of the mounting flange 84, preventing rotation of the spacer plate 78 about the z-axis 72 with respect to the receptacle base 74. The asymmetrical flange 94 is disposed within the asymmetrical aperture 100 of the spacer plate 78.

For connection with the gearbox 56, the connecting pipe 110 is disposed over the spacer plate 78, and the first and second bolts 108 and 114 are torqued into the self-clinching nuts 112 and 116 until the sealing element 118 compresses to form a leak-tight joint between the tubular insert 76 and the connecting pipe 110.

Figure 7:
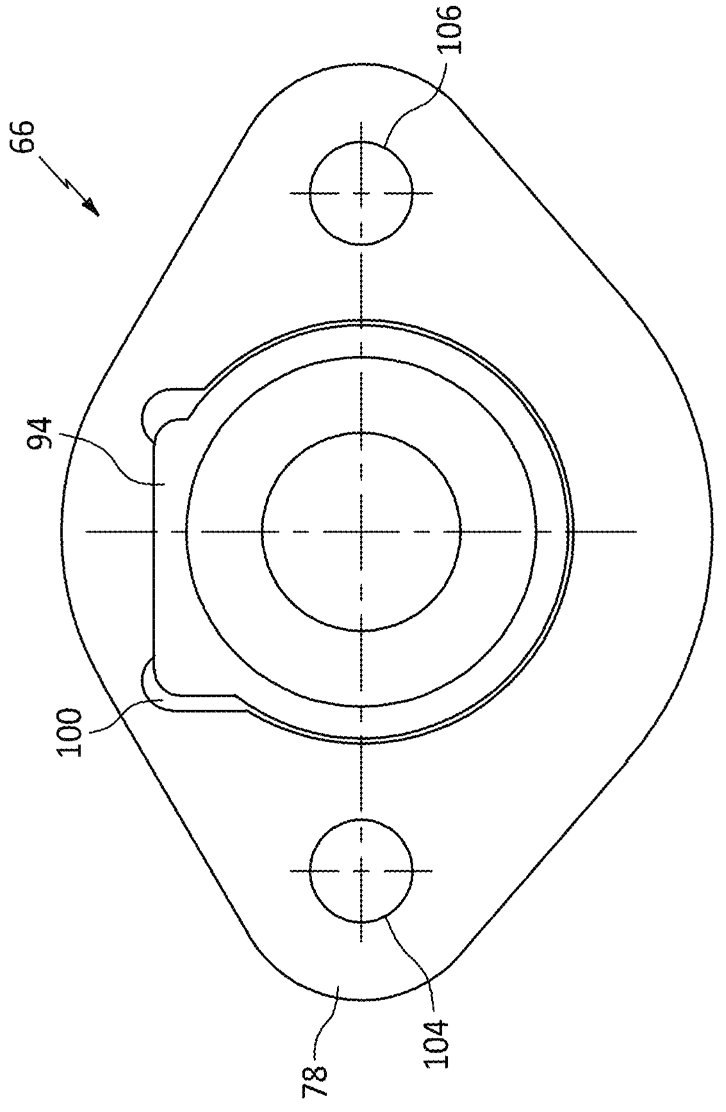
FIG. 7 schematically illustrates a plan view of the tube insert assembly in the assembled state, in accordance with one or more embodiments of the present disclosure.

FIG. 7 schematically illustrates a plan view of the tube insert assembly 66 in the assembled state. The asymmetrical flange 94 of the tubular insert 76 is disposed within the asymmetrical aperture 100 of the spacer plate 78. The asymmetrical flange 94 is locked in place by both the asymmetrical aperture 100 of the spacer plate 78 and the asymmetrical recess 88 of the receptacle base 74, preventing lateral movement of the tubular insert along the x-axis 68 and the y-axis and rotation about the z-axis, with respect to the both the receptacle base 74 and the spacer plate 78. Based on the corresponding shapes of the asymmetrical recess 88, the asymmetrical flange 94, and the asymmetrical aperture 100, as well as the corresponding positioning of the tab 102 and the notched region 86, it is not possible to install the tubular insert 76 an upside-down or rotated position. Any mis-alignment of the tubular insert 76 blocks full bolt engagement due to the seating depth of the receptacle base 74 and the thickness of the spacer plate 78. Blocked full bolt engagement signals an assembly error to the installer. Accordingly, this passive mechanical arrangement guarantees correct orientation of the beveled tube 98 in the core gas flow path 64.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms “a,” “an,” and “the” refer to one or more than one, unless the context clearly dictates otherwise. For example, the term “comprising a specimen” includes single or plural specimens and is considered equivalent to the phrase “comprising at least one specimen.” The term “or” refers to a single element of stated alternative elements or a combination of two or more elements unless the context clearly indicates otherwise. As used herein, “comprises” means “includes.” Thus, “comprising A or B,” means “including A or B, or A and B,” without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A tube insert assembly for a gas turbine engine, the tube insert assembly comprising:

a receptacle base disposed on a static structure of the gas turbine engine, the receptacle base comprising a mounting flange and a bore extending through the receptacle base, wherein a top surface of the mounting flange comprises an asymmetrical recess disposed around the bore; and a tubular insert comprising a tube and an asymmetrical flange disposed around a circumference of the tube, wherein the asymmetrical flange is disposed within the asymmetrical recess of the mounting flange and the tube is disposed within the bore of the receptacle base.

2. The tube insert assembly of claim 1, further comprising:

a spacer plate disposed on the mounting flange, wherein the spacer plate comprises an asymmetrical aperture disposed around the asymmetrical flange of the tubular insert, and wherein the asymmetrical aperture and the asymmetrical recess have substantially similar shapes.

3. The tube insert assembly of claim 2, wherein the asymmetrical flange fits in a single orientation within the asymmetrical recess and the asymmetrical aperture.

4. The tube insert assembly of claim 2, wherein the asymmetrical flange, the asymmetrical recess, and the asymmetrical aperture prevent lateral movement and rotation of the tubular insert with respect to the receptacle base and the spacer plate.

5. The tube insert assembly of claim 2, wherein:

the mounting flange comprises a first perimeter with a notched region; and the spacer plate comprises a second perimeter with a tab that projects downwardly over the notched region of the mounting flange.

6. The tube insert assembly of claim 5, wherein the tab over the notched region prevents rotation of the spacer plate with respect to the receptacle base.

7. The tube insert assembly of claim 2, wherein:

the receptacle base further comprises a first bolt hole and a second bolt hole extending through the mounting flange on opposing sides of the asymmetrical recess; and the spacer plate further comprises a third bolt hole and a fourth bolt hole extending through the spacer plate on opposing sides of the asymmetrical aperture, wherein the third bolt hole is aligned above the first bolt hole and the fourth bolt hole is aligned above the second bolt hole.

8. The tube insert assembly of claim 7, further comprising:

a connecting pipe comprising a flange disposed over the spacer plate;

a first nut disposed below the first bolt hole;

a second nut disposed below the second bolt hole;

a first bolt extending through the flange, the third bolt hole, and the first bolt hole, and engaged with the first nut; and a second bolt extending through the flange, the fourth bolt hole, and the second bolt hole, and engaged with the second nut.

9. The tube insert assembly of claim 1, wherein the receptacle base is integrated with or fixed to the static structure, the bore extends through the static structure, and the tube extends into a core gas flow path within the static structure.

10. The tube insert assembly of claim 1, wherein a depth of the asymmetrical recess is less than a thickness of the mounting flange.

11. The tube insert assembly of claim 1, wherein the asymmetrical recess comprises one or more asymmetrical extensions from a circular shape, the asymmetrical flange comprises one or more asymmetrical protrusions from the circular shape, and the one or more asymmetrical extensions correspond in size and alignment with the one or more asymmetrical protrusions.

12. The tube insert assembly of claim 1, wherein:

the bore of the receptacle base comprises an inset shoulder, and the tubular insert comprises a shoulder disposed between the asymmetrical flange and the tube;

the shoulder of the tubular insert is seated on the inset shoulder of the bore; and a first diameter of the asymmetrical flange is greater than a second diameter of the shoulder, and the second diameter of the shoulder is greater than a third diameter of the tube.

13. The tube insert assembly of claim 1, further comprising a sealing element disposed between the asymmetrical flange and the connecting pipe.

14. A tube insert assembly for a gas turbine engine, the tube insert assembly comprising:

a receptacle base disposed on a static structure of the gas turbine engine, the receptacle base comprising a mounting flange and a bore extending through the receptacle base;

a tubular insert comprising a tube and an asymmetrical flange disposed around a circumference of the tube, wherein the tube is disposed within the bore of the receptacle base; and a spacer plate disposed on the receptacle base, the spacer plate comprising an asymmetrical aperture disposed around the asymmetrical flange of the tubular insert.

15. The tube insert assembly of claim 14, wherein a top surface of the mounting flange comprises an asymmetrical recess disposed around the bore, and the asymmetrical flange is disposed within the asymmetrical recess of the mounting flange.

16. The tube insert assembly of claim 15, wherein the asymmetrical flange, the asymmetrical recess, and the asymmetrical aperture prevent lateral movement and rotation of the tubular insert with respect to the receptacle base and the spacer plate.

17. The tube insert assembly of claim 14, wherein the receptacle base is integrated with or fixed to the static structure, the bore extends through the static structure, and the tube extends into a core gas flow path within the static structure.

18. The tube insert assembly of claim 14, wherein:

the mounting flange comprises a first perimeter with a notched region; and the spacer plate comprises a second perimeter with a tab that projects downwardly over the notched region of the mounting flange.

19. The tube insert assembly of claim 18, wherein the tab over the notched region prevents rotation of the spacer plate with respect to the receptacle base.

20. A tube insert assembly for a gas turbine engine, the tube insert assembly comprising:

a receptacle base disposed on a static structure of the gas turbine engine, the receptacle base comprising a bore extending through the receptacle base and an asymmetrical recess disposed around the bore, wherein the receptacle base comprises a first perimeter with a notched region;

a tubular insert comprising a tube and an asymmetrical flange disposed around a circumference of the tube, wherein the asymmetrical flange is disposed within the asymmetrical recess and the tube is disposed within the bore; and a spacer plate disposed on the receptacle base, wherein the spacer plate comprises an aperture disposed around the asymmetrical flange, and the spacer plate further comprises a second perimeter with a tab that projects downwardly over the notched region of the receptacle base.

* * * * *